(No Model.) 3 Sheets—Sheet 1.

N. J. WINLUND & E. McSHERRY.
MECHANICAL MOVEMENT.

No. 450,122. Patented Apr. 7, 1891.

Witnesses:
E. L. Southworth
E. Behel

Inventors:
Nicholas J. Winlund
Edward McSherry
By A. O. Behel
Attys.

(No Model.) 3 Sheets—Sheet 2.

N. J. WINLUND & E. McSHERRY.
MECHANICAL MOVEMENT.

No. 450,122. Patented Apr. 7, 1891.

Witnesses:
C. L. Southworth.
E. Behel.

Inventors:
Nicholas J. Winlund
Edward McSherry
By A. O. Behel
Atty.

(No Model.) 3 Sheets—Sheet 3.

N. J. WINLUND & E. McSHERRY.
MECHANICAL MOVEMENT.

No. 450,122. Patented Apr. 7, 1891.

Witnesses:
C. L. Southworth
E. Behel.

Inventors:
Nicholas J. Winlund
Edward McSherry
By A. O. Behel
Attys.

UNITED STATES PATENT OFFICE.

NICHOLAS J. WINLUND AND EDUARD McSHERRY, OF ROCKFORD, ILLINOIS.

MECHANICAL MOVEMENT.

SPECIFICATION forming part of Letters Patent No. 450,122, dated April 7, 1891.

Application filed November 28, 1890. Serial No. 372,817. (No model.)

*To all whom it may concern:*

Be it known that we, NICHOLAS J. WINLUND, a subject of the King of Sweden, and EDUARD McSHERRY, a citizen of the United States, both residing at Rockford, in the county of Winnebago and State of Illinois, have invented certain new and useful Improvements in Mechanical Movements, of which the following is a specification.

The object of this invention is to produce an oscillating or rotating movement from a constantly-rotating movement and to change from one to the other without interruption or break.

Figure 1:
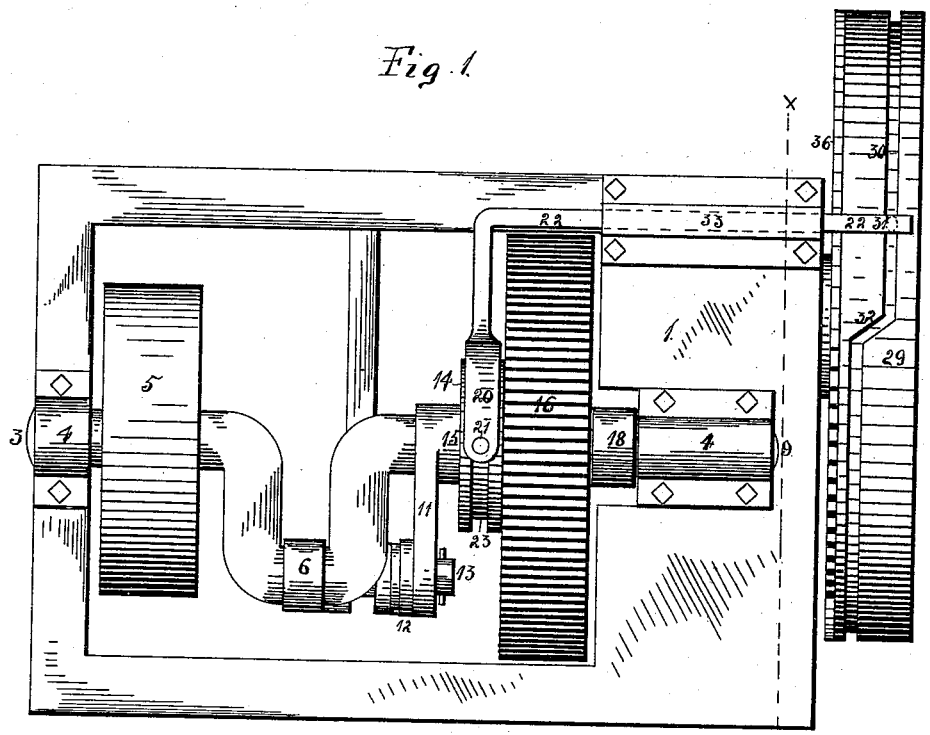
Figure 2:
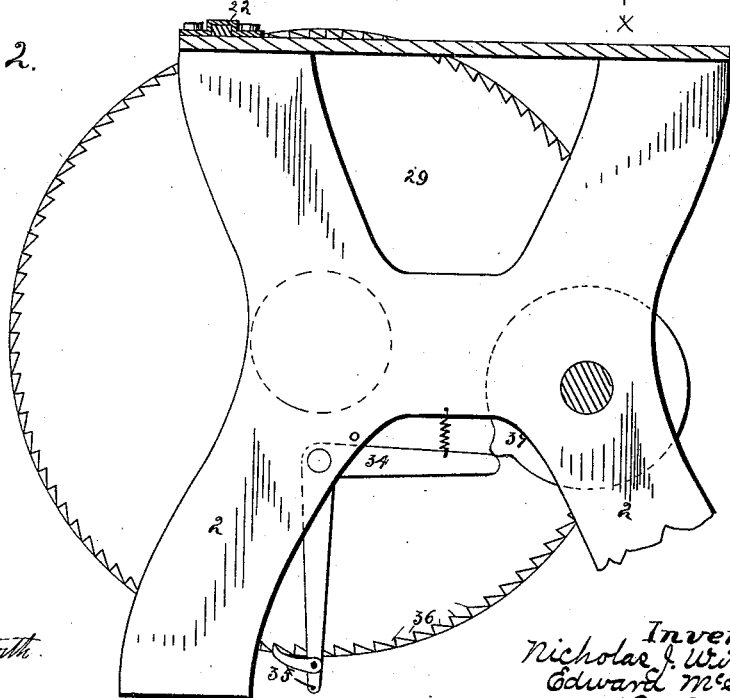
Figure 3:
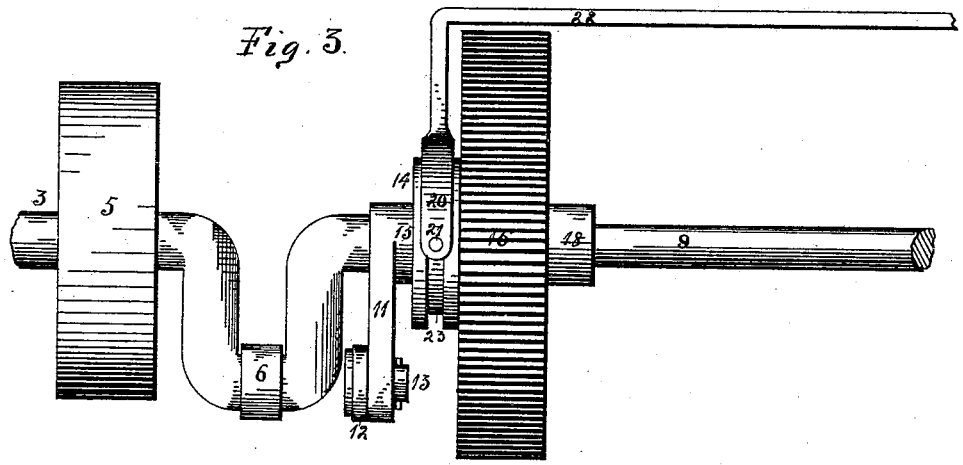
Figure 4:
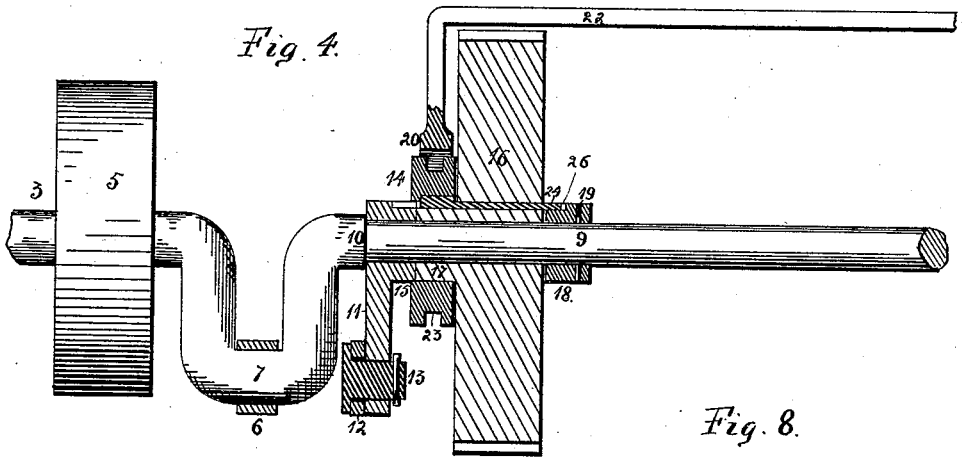
Figures 6, 7:
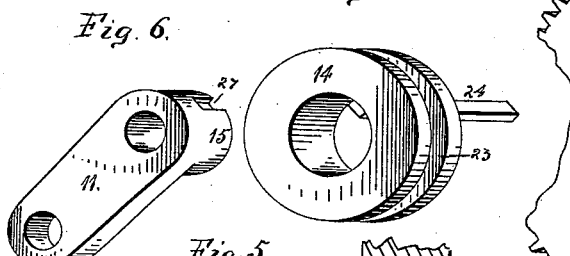
Figure 5:
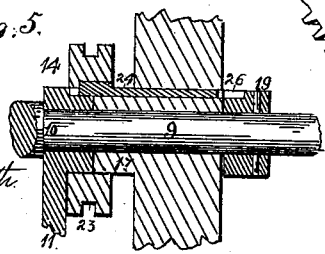
Figures 8, 9:
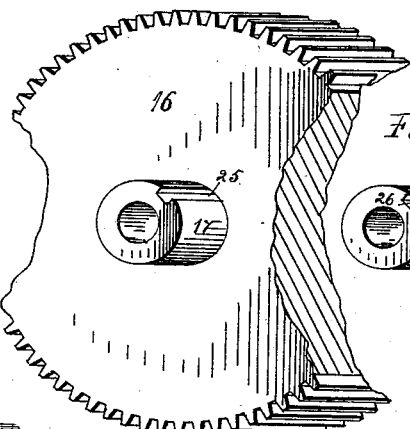
Figure 11:
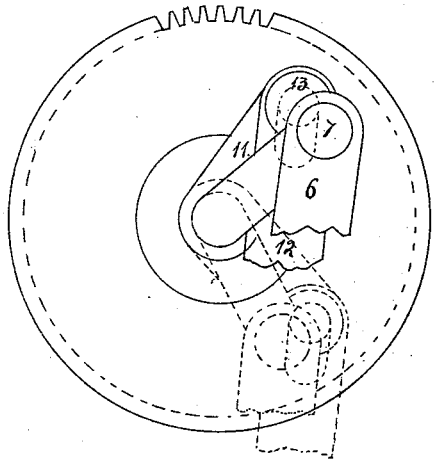
Figure 12:
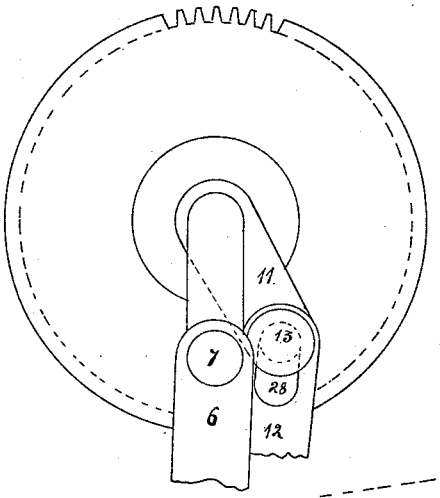
Figure 10:
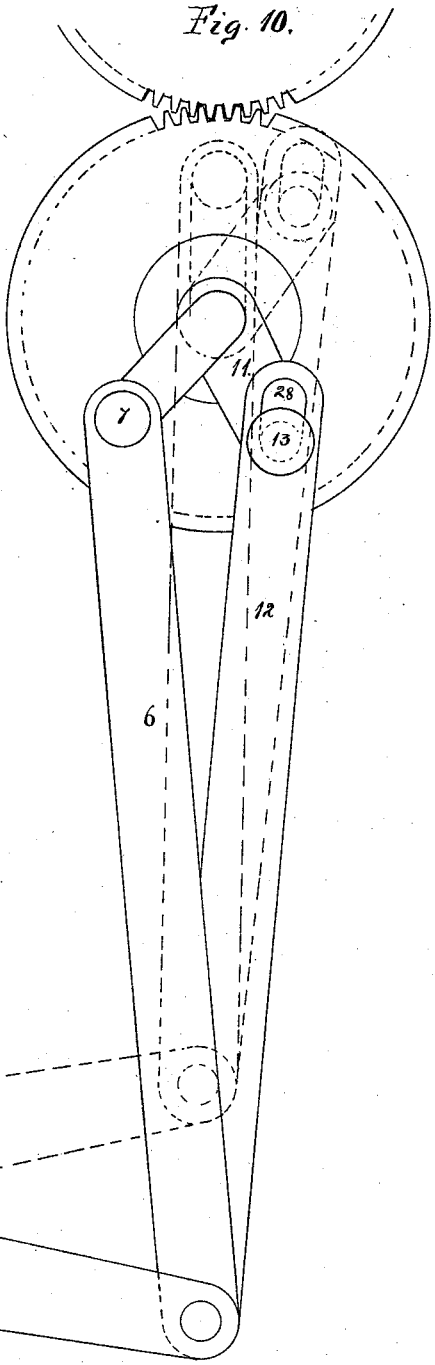

In the accompanying drawings, Figure 1 is a plan view of our improved mechanical movement. Fig. 2 is a vertical section on dotted line $x$, Fig. 1. Fig. 3 is a plan view of a portion of the movement in which a rotary movement is imparted to the driven wheel. Fig. 4 is a horizontal section of the movement, showing the construction of its parts, and in which a rotary movement is imparted to the driven wheel. Fig. 5 is also a horizontal section of the movement in which an oscillatory movement is imparted to the driven wheel. Fig. 6 is an isometrical representation of the oscillating arm. Fig. 7 is an isometrical representation of the movable clutch. Fig. 8 is an isometrical representation of the driven wheel. Fig. 9 is an isometrical representation of the rotary collar which is secured to the rotating shaft. Fig. 10 is a side elevation of the pitman-rods for forming a connection between the constantly-rotating driver and the oscillatory portion of the movement. Figs. 11 and 12 show the different positions of the pitmen in their connections with the rotating and oscillating parts.

The top plate 1 of the main frame is supported on legs 2. Upon the upper surface of the top plate is located a shaft 3, held in position to rotate by bearings 4, secured to the top plate. This shaft has a pulley 5 secured thereto, which has a belt connection with any prime mover. A portion of the shaft is bent in crank form, and a pitman-rod 6 has a connection with the wrist portion 7 of the crank. The lower end of this pitman-rod has a pivotal connection with an arm or swinging support 8, which has a pivotal connection with a stationary support. A portion 9 of the horizontal shaft is reduced in diameter, the shoulder 10 formed by such reduction forming a stop, against which an oscillating arm 11 rests. This arm has a connection with the arm 8 through the pitman-rod 12, and a pin 13 passed through the upper end of the pitman and oscillating arm forms a connection between them. The upper end of the pitman 12 is slotted for a purpose to appear hereinafter. A sliding and rotating clutch member 14 is next placed over the shaft and has its inside bore about equal to the outside diameter of the hub portion 15 of the oscillating arm. A toothed wheel 16 is next placed on the shaft 9, so as to oscillate independently thereof. It has a hub 17 extending from one side, and its outside diameter is equal to the hub of the oscillating arm. A collar 18 is placed on the shaft, and is secured thereto so as to rotate therewith by a pin 19, passing through the collar and shaft.

The clutch-shipper consists of a yoke 20, having pins 21 projecting inward from its ends, and an extension 22, having a connection with means for shifting the clutch-member, which will be described further on. The pins 21 of the yoke enter an annular groove 23, formed in the periphery of the clutch member in such a manner as to allow the clutch member to rotate or oscillate and to be shifted in the lengthwise direction of the shaft. The clutch member is provided with a bar 24 secured thereto which extends beyond one of its faces. This bar when in position passes through a groove 25, formed in the hub and through the driven wheel 16, which forms a connection between the clutch member and driven wheel at all times. When the clutch member is in the position shown at Fig. 4, the bar 24 extends beyond the smooth face of the driven wheel and enters a groove 26, formed in the periphery of the rotating collar 18, thereby forming a connection between the driven wheel and rotating shaft 9. When the clutch member is moved to the position shown at Fig. 5, the bar 24 enters the groove 27, formed in the periphery of the hub of the oscillating arm, thereby forming a connection between the driven wheel and oscillating arm. A rotary movement being imparted to the shaft 3, through a belt connection with the pulley 5, will cause the crank to revolve, which will move the pitman 6 and arm 8 on their pivotal supports, and will also impart a reciprocating movement to the pitman 12 and therethrough an oscillating movement to the arm 11—that is, we have a continuous rotary movement of the shaft and an oscillating movement imparted to the arm 11.

Should the clutch member be in engagement with the collar 18, as shown at Fig. 4, a rotary movement will be imparted to the driven wheel 16 so long as such connection is established, or an oscillatory movement will be imparted to the driven wheel so long as the clutch member remains in the position shown at Fig. 5.

At Fig. 10 we have shown the position of the pitmen in their connection with the crank and oscillating arm at the point where the upward oscillation begins, and have shown in the same figure in dotted lines the position of the parts when the upward oscillation is completed. It will be noticed that the upward rotary movement of the crank and the upward oscillatory movement of the arm will be in opposite directions. When the highest point of the crank is reached, the oscillating arm comes to a standstill and will remain so until the crank has descended and passes the oscillating arm and has reached a position shown in solid lines at Fig. 11. The reason for this standstill is owing to the slot 28 in the pitman, which allows the pitman to descend until the upper end of the slot comes in contact with the pin 13, forming a connection between it and the arm. The oscillating arm and rotary crank will move in unison from their solid-line position (shown in Fig. 11) until they reach their dotted-line position shown in the same figure, when the rotating crank begins to gain upon the oscillating arm until they reach their extreme downward position. (Shown in Fig. 12.) At this point the rotating arm will begin its upward course, and the oscillating arm will stand still until the lower end of the slot 28 in its pitman comes in contact with the pin 13, when the parts will occupy the position shown in solid lines at Fig. 10, when the crank has made a complete revolution and the oscillating arm returned to its starting position.

From the above it will be seen that the rotating and oscillating movements are uniform nearly the complete downward oscillation of the arm.

It is when the rotary and oscillatory movements are in the same direction and at the same rate of speed that we shift the clutch member from the rotating-hub into engagement with the oscillating arm, and vice versa, and this can take place at any time when they so move together, and by reason of the clutch member and driven wheel always moving in unison the driven wheel will partake of the movements imparted to the clutch member by its engagement with the rotary collar, and the clutch member will not release its engagement with the collar until it is in engagement with the oscillating arm, and vice versa, so that a change is made from one movement to the other without interruption or break of any kind.

In order to control the movements of the clutch member automatically, we have formed a connection between the clutch member and its governing pattern-wheel. This pattern-wheel 29 has a pivotal connection with the main supporting-frame, and has its periphery provided with an annular groove 30 of irregular form, and by reason of a pin 31, depending from the free end of the extension 22 of the clutch member shipper the shipper will be reciprocated endwise as the pin ascends or descends the switch 32 of the annular groove. This extension is held in position so that the reciprocating movements can be imparted thereto by a bearing 33 placed over it and secured to the main frame. An intermittent rotary movement is imparted to the pattern-wheel in any desired manner—for instance, a pivoted angle-iron arm 34, carrying a spring-actuated dog 35, which engages the teeth 36, formed in the periphery of the wheel. This arm can be operated upon by a cam-wheel 37, to which a rotary movement is imparted.

We have shown the driven wheel having teeth; but it is evident that a pulley can be used, and a connection is formed between this wheel or pulley with any device which may employ it as a driving means, and will be especially adapted to knitting-machines. We have also shown the clutch member and driven wheel of separate parts, but instead of which they may be one, and shift the driven wheel, which will necessitate the setting back of the rotary collar 18 to give sufficient space in which to shift the wheel.

We claim as our invention—

1. The combination of a rotating shaft, an oscillating arm and a driven wheel loosely mounted on said shaft, and means for locking the wheel in engagement with either the shaft or oscillating arm, substantially as set forth.

2. The combination of a rotating shaft, an oscillating arm and a driven wheel loosely located on said shaft, and a clutch member having a connection with the wheel and capable of locking the wheel in engagement with either the shaft or oscillating arm, substantially as set forth.

3. The combination of a rotating shaft, an oscillating arm and a driven wheel loosely mounted thereon, and a clutch member having a connection with the wheel and capable of locking the wheel in engagement with either the shaft or oscillating arm, and means for automatically controlling the movements of the clutch, substantially as set forth.

4. The combination of a rotating shaft, a driven wheel loosely mounted on the shaft, a collar secured to the shaft, located on one side of the wheel, and an oscillating arm located on the opposite side of the wheel, and a sliding clutch member having an arm extending through the wheel, by means of which a connection can be formed between the wheel and rotating shaft or oscillating arm, substantially as set forth.

5. The combination of a shaft, a driven wheel and an oscillating arm loosely mounted thereon, means for locking the wheel in engagement with either the shaft or arm, a double pitman connection with the shaft and arm, and a swinging support through the medium of which the rotary shaft imparts the oscillating movement to the arm, the pitman to the arm having a slotted end, substantially as set forth.

6. The combination of a rotary shaft, an oscillating arm and a driven wheel loosely mounted on said shaft, and a pattern-wheel for automatically locking the wheel in engagement with either the shaft or oscillating arm, substantially as set forth.

NICHOLAS J. WINLUND.
EDUARD McSHERRY.

Witnesses:
A. O. BEHEL,
E. BEHEL.